G. W. BIGELOW.
Dynamometers.

No. 144,945.  Patented Nov. 25, 1873.

Witnesses.  Geo. W. Bigelow
Inventor
By Atty's

UNITED STATES PATENT OFFICE.

GEORGE W. BIGELOW, OF NEW HAVEN, CONNECTICUT.

IMPROVEMENT IN DYNAMOMETERS.

Specification forming part of Letters Patent No. 144,945, dated November 25, 1873; application filed September 16, 1873.

*To all whom it may concern:*

Be it known that I, GEORGE W. BIGELOW, of New Haven, in the county of New Haven and State of Connecticut, have invented a new Improvement in Dynamometers; and I do hereby declare the following, when taken in connection with the accompanying drawings and the letters of reference marked thereon, to be a full, clear, and exact description of the same, and which said drawings constitute part of this specification, and represent, in—

Figure 1:
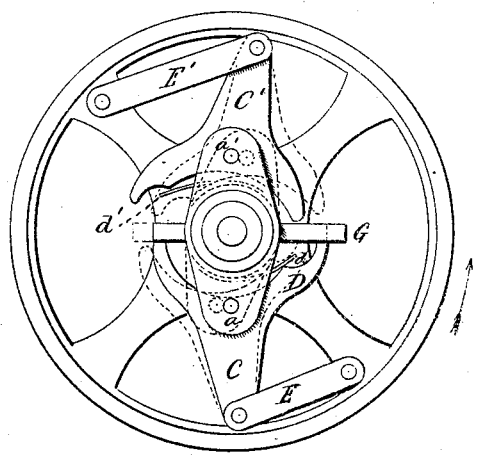
Figure 2:
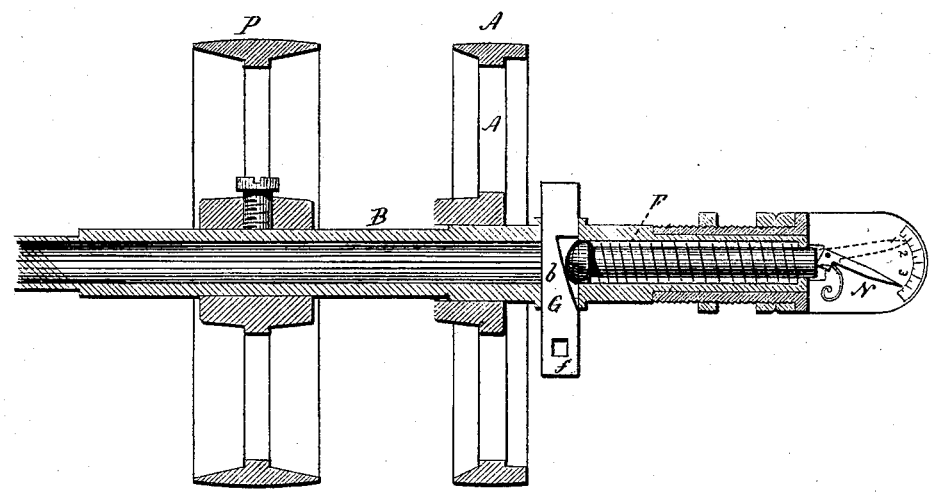

Figure 1, an end view; and in Fig. 2, a longitudinal central section.

This invention relates to an improvement in what is termed a dynamometer—that is to say, a device for ascertaining the amount of power which is required to run certain machines, or the amount of power which may be used by different parties from the same shaft; and the invention consists in the arrangement of a pulley loosely upon the shaft, and which may be the pulley through which power is imparted to the shaft, or the pulley from which power is taken, in combination with a lever, the fulcrum of which is firmly attached to and revolves with the shaft, one arm of the said lever connected to the said pulley, the other acting directly or indirectly upon a longitudinally-sliding bar, and a spring interposed between the said shaft and pulley to offer a certain or known amount of resistance to the movement of the pulley or shaft, so that the pulley, through the connection of the lever with the shaft, will revolve with the shaft until a resistance to the revolution of the shaft or pulley is offered; then the lever will be turned, the resistance overcome to a certain extent, and the said sliding bar moved accordingly—that is, in proportion to the resistance, the extent of movement of the said sliding bar indicating the amount of resistance.

A is a pulley, which is arranged upon a shaft, B, loosely thereon. C is one arm, and D the other arm, of a lever, hung at *a*, the said fulcrum *a* firmly attached and so as to move with the shaft B. The arm C of this lever is connected to the pulley by a connecting-rod, E, so that the turning of the pulley in the direction denoted by the arrow, and independent of the shaft, will force the arm D of the lever toward the shaft. Beneath the arm D of the lever, or at other convenient point, a spring, *d*, is arranged, which offers a resistance to the turning of the pulley. Within the shaft a longitudinal bar, F, is arranged to slide freely longitudinally therein, and upon this a spiral spring is placed, the tendency of which is to force the said bar into the shaft. Transversely through the shaft a slide, G, is arranged to move freely, and is connected to the arm D of the lever, preferably by extending the end of the arm D into an opening, *f*, in the said slide. The movement of the arm D toward and from the shaft, will impart a corresponding movement to the slide G. This slide is constructed with an incline upon its edge, against which the end of the bar F rests; therefore, as the slide is moved through the shaft it forces the bar longitudinally, and this movement of the bar is communicated to an indicator, N, in the usual manner, this indicator denoting the extent of movement of the shaft, and the indicator utilized, as hereinafter described.

The operation of this device is as follows: Suppose the power to be applied to the pulley A to cause the revolution of the shaft, and the strength of the spring *d* such that the pulley will cause the revolution of the shaft without depressing the spring. To take power from the shaft another pulley, P, is securely attached to the shaft in the usual manner. Thus taking the power, resistance will be offered to the pulley P equal to the amount of power which the pulley P is to drive; therefore, the pulley A will turn on the shaft until the compression of the spring *d* equals the power required to drive the pulley P, and this depression will cause a corresponding longitudinal movement of the bar F and the indicator N. The power required to move the indicator being known, the distance which it moves indicates the power being taken from the shaft; or, reverse the operation, apply the power for driving the shaft to the fixed pulley P, and take the power from the pulley A, will in like manner indicate the amount of that power; but the first arrangement is preferable.

In order to counterbalance the lever C D, as well as to strengthen the spring *d* by duplication thereof, I arrange a corresponding lever, C', with a corresponding spring, *d'*, beneath it, the said lever having its fulcrum at *a'*, and connected to the pulley by the connecting-rod E'.

It is not essential that the resistance caused by the spring $d$ should be applied directly to the levers, as shown, it only being required that such a resistance should be arranged somewhere between the pulley and shaft; neither is it essential that the transverse slide G should be employed, as the arm D of the lever may act directly, or otherwise indirectly upon the sliding bar F.

I claim as my invention—

1. The pulley A loose upon the shaft B, the lever C D having its fulcrum in connection and so as to revolve with the shaft, one arm, C, in connection with the said pulley, the arm D acting directly or indirectly upon a longitudinally-sliding bar, F, and a spring interposed between the said pulley and shaft to offer a resistance to the turning of one by the other, the construction and arrangement of the said parts being substantially as described, so that the power more than sufficient to overcome the said resistance will cause the said lever to turn and impart a corresponding longitudinal movement to the said bar, and thereby indicate the amount of such power.

2. In combination with the pulley A, loose upon the shaft B, the lever C D, spring $d$, the transverse slide G provided with the incline $b$, and the longitudinally-sliding bar F, all substantially as described.

3. In combination with the pulley A, loose upon the shaft B, the two levers C D and C' D', the springs $d$ $d'$, one or both of said levers acting directly or indirectly upon the longitudinally-sliding bar F, substantially as specified.

GEORGE W. BIGELOW.

Witnesses:
J. H. SHUMWAY,
A. J. TIBBITS.